Figure 1:
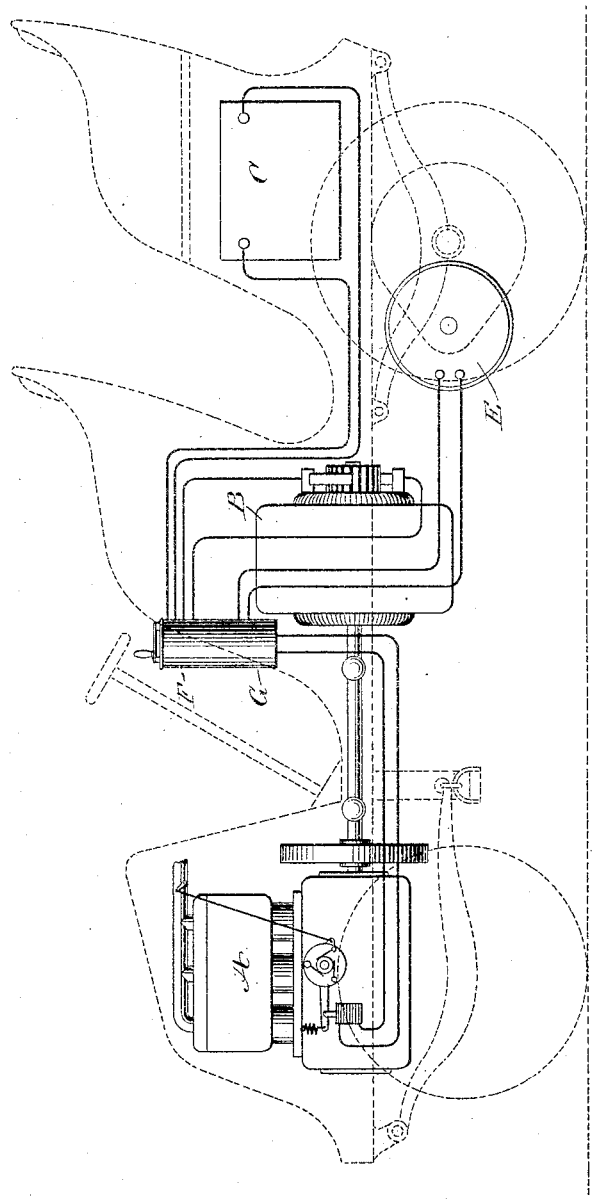

No. 786,376. PATENTED APR. 4, 1905.
L. G. NILSON.
ELECTROGASOLENE VEHICLE.
APPLICATION FILED MAY 15, 1902.

2 SHEETS—SHEET 1.

WITNESSES:
Edward Thorpe
R. Ferguson

INVENTOR
Lars G. Nilson
BY
ATTORNEYS.

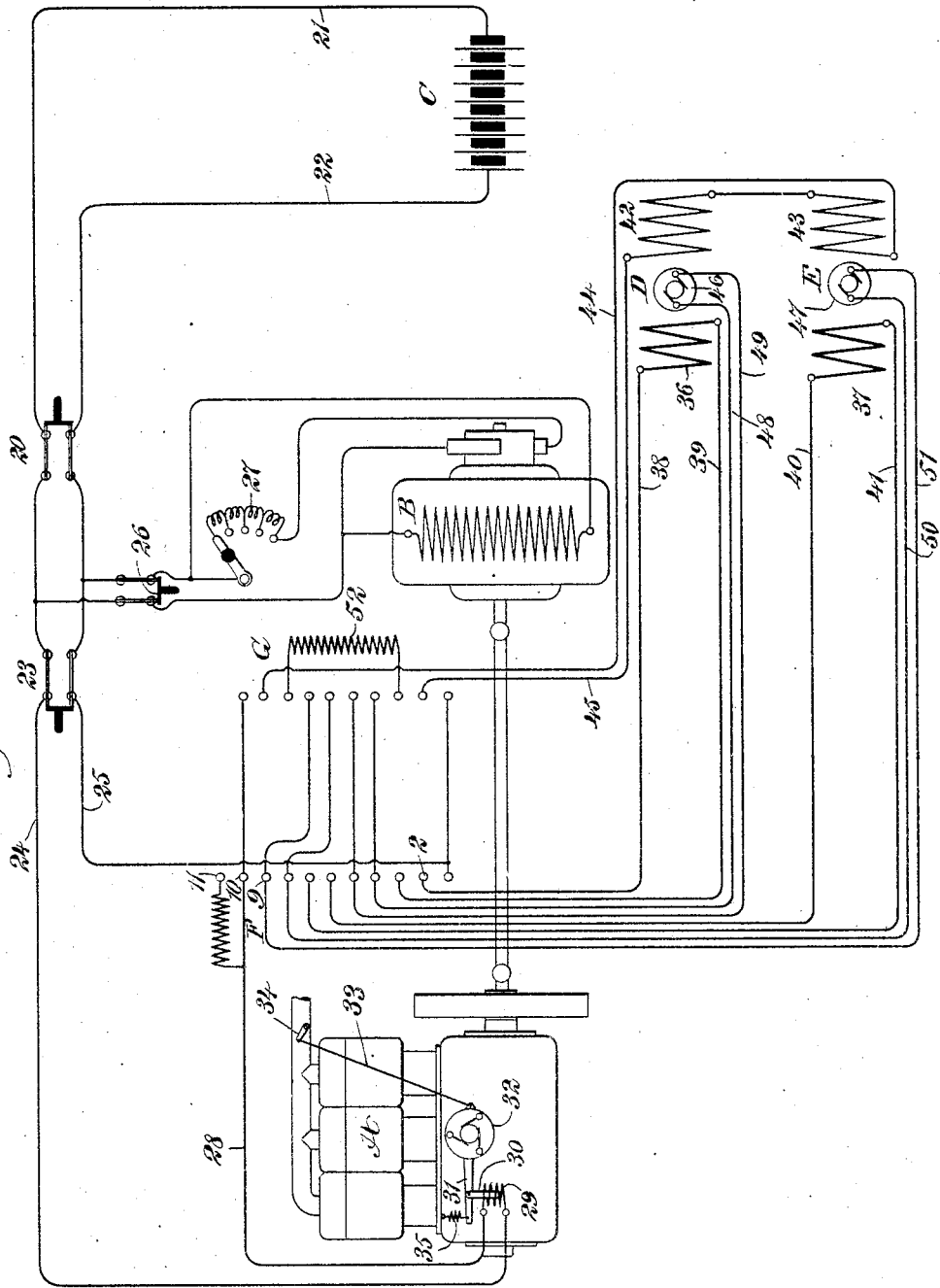

No. 786,376.

Patented April 4, 1905.

UNITED STATES PATENT OFFICE.

LARS G. NILSON, OF NEW YORK, N. Y., ASSIGNOR, BY MESNE ASSIGNMENTS, TO FISCHER MOTOR VEHICLE COMPANY, A CORPORATION OF NEW JERSEY.

ELECTROGASOLENE-VEHICLE.

SPECIFICATION forming part of Letters Patent No. 786,376, dated April 4, 1905.

Application filed May 15, 1902. Serial No. 107,391.

*To all whom it may concern:*

Be it known that I, LARS G. NILSON, a citizen of the United States, and a resident of the city of New York, borough of Manhattan, in the county and State of New York, have invented a new and Improved Electrogasolene-Vehicle, of which the following is a full, clear, and exact description.

This invention relates to motor-vehicles, and has especial reference to such vehicles as are driven by electricity.

The objects of the invention are to provide improved controlling and operating mechanism and in vehicles of the type which employ an engine driving a dynamo a motor or motors and a storage battery so arranged as to permit the dynamo to supply both the motor and the storage battery and to permit the battery to supply the motor as an auxiliary to the dynamo, to provide means whereby the charging of the batteries and the output of current from the dynamo may be automatically regulated according to the demand for current, and means whereby the motors may be readily controlled to operate as motors, as braking means, or as battery-charging means. I prefer to provide a main and an auxiliary controller, the main controller regulating the ordinary running speeds of the motor and an auxiliary controller regulating the operation of the motor, as a braking, or as a charging means, and to prevent accidents provide means whereby the auxiliary controller will be inoperative except when the main controller is in certain positions.

The invention also includes other features of advantage, which will more fully appear hereinafter.

Referring to the accompanying drawings, Figure 1 is a side elevation showing my invention applied to a two-seated vehicle. Fig. 2 is a diagrammatic view of the circuits.

A indicates an engine, preferably internal-combustion or explosive type; B, a dynamo coupled thereto; C, an accumulator or storage battery, which is made of sufficient size to drive the vehicle for a short time without the assistance of the dynamo, but which normally assists the latter when the load is heavy.

D and E are the motors, one being connected to each rear wheel. If preferred, the motor or motors may be connected to one axle to drive both wheels.

F is the main controller for controlling the speed of the vehicle made under ordinary conditions, and G is the auxiliary controller for causing the motors to act as brakes or to charge the batteries. The main controller F and auxiliary controller G may be of any suitable type—for example, of the general construction illustrated in my Patent No. 714,021, dated November 18, 1902, modified to meet individual conditions.

The motors D and E are suitably connected with the controllers F and G in such a manner as to enable the vehicle to be controlled under the various conditions of service, and this system of control and apparatus is not claimed herein, but is made the subject of a divisional application filed June 10, 1904, Serial No. 211,945.

20 is a switch for disconnecting the circuit 21 22, leading to the accumulator C. A switch 23 is employed for disconnecting the controller and motor circuits 24 25, and 26 is a main-line switch for the dynamo B, which leads through a rheostat 27, connected in series with the armature of the dynamo. It will be noticed that by closing the switches 20 and 23 and opening the switch 26 the vehicle can be run as a simple electric vehicle or by closing the switches 23 and 26 and opening the switch 20 while the engine A is in operation the motors D and E can be run directly by the current produced by the dynamo B. I have found, however, that by having the battery, dynamo, and controllers all in multiple a better result is obtained and gives a greater flexibility to the entire system. I have also found that in order to economize with the weight as much as possible the proportion of the different parts will be such that the full output of the current from the dynamo would be injurious to the battery. Therefore I have provided an automatic regulator for the engine A, which acts on the fuel-supply and the igniting mechanism of the source of energy of the engine to control the speed of the engine, and so control the amount of current from the dynamo according to the demands of the motors D and E.

Referring particularly to Fig. 2, it will be noted that the main wire 28, which furnishes the supply of current to the controller F and thence to the motors D and E, runs through a solenoid 29, in which the core 30 operates. This solenoid is also connected with the main wire 24. The core 30 is connected to a lever 31, extended from a disk 32, on which the contact-springs of the igniting apparatus are arranged. This disk has a rod or other connection 33 with the throttle-lever 34. Normally a spring 35, connected at one end to the engine and at the other end to the lever 31, keeps the contact-disk and throttle in a position where the engine and dynamo are producing a comparatively small amount of current, predetermined according to the size of the battery; but when the current is thrown into the motors D and E by means of the controller the action of the current will draw the core 30 downward, consequently rocking the disk 32, which will open the throttle, thereby increasing the speed of the engine and the output of the dynamo to the amount of current needed. The solenoids 29 may of course, if desired, be wound with a fine wire of high enough resistance to stand the full voltage used, in which case connection should be made to points 2 and 9 of the main controller F.

With the arrangement above described whenever the motors are cut out of circuit the speed of the engine and consequent output of the current from the dynamo will be reduced, and immediately upon cutting in the motors the dynamo output is increased according to the demands of the motors.

It is to be understood that the general arrangement or distribution of the several parts may be changed to suit different conditions. In the present instance I have shown the combustion-engine as located at the forward portion of the vehicle, the dynamo underneath the middle seat, and the accumulator under the rear seat. This arrangement answers very well for a light-weight carriage; but for delivery-wagons or the like it might be practical to arrange the devices very differently.

Having thus described my invention, I declare that what I claim as new, and desire to secure by Letters Patent, is—

1. The combination of a storage battery, a motor and a dynamo connected in multiple, an engine driving the dynamo, and means, responsive to variations of current in the motor-circuit, for controlling the output of current from the dynamo, substantially as described.

2. The combination of a storage battery, a motor and a dynamo connected in multiple, an engine driving the dynamo, and means, responsive to variations of current in the motor-circuit, for controlling the speed of the engine, substantially as described.

3. The combination of a storage battery, a dynamo connected therewith, a motor, and means whereby when the motor is connected with the dynamo the output of the latter is increased, substantially as described.

4. The combination of a storage battery, a dynamo connected therewith, a motor, and means whereby when the motor is connected with the dynamo the output of the latter is increased and when the motor is cut out of circuit the output of the dynamo is reduced, substantially as described.

5. The combination of a storage battery, a dynamo of larger capacity than the storage battery and connected therewith, means for normally operating said dynamo at a speed which generates current below the safe capacity of the storage battery, a motor, and means whereby when the motor is connected with the dynamo the speed of the latter is increased, substantially as described.

6. The combination of a storage battery, a dynamo of larger capacity than the storage battery and connected therewith, means for normally operating said dynamo at a speed which generates current below the safe capacity of the storage battery, a motor, and means whereby when the motor is connected with the dynamo the speed of the latter is increased, and regulated according to the demands of the motor, substantially as described.

7. The combination of a storage battery, a motor and a dynamo connected in multiple, an engine driving the dynamo, means, responsive to variations of current in the motor-circuit, for controlling the speed of the engine, and means whereby when said motor is disconnected the speed of the engine is reduced, substantially as described.

8. In a vehicle, the combination with a motor, of a dynamo, and means for automatically controlling the output of the dynamo according to the demand of the motor, substantially as described.

9. In a vehicle, the combination with a motor, a dynamo and means for driving the dynamo, of means for automatically controlling the dynamo-driving means according to the demand of the motor, substantially as described.

10. In a vehicle, the combination with a motor, a dynamo and means for driving the dynamo, of electric means for automatically controlling the dynamo-driving means according to the demand of the motor, substantially as described.

11. In combination with a vehicle, an electric motor, an accumulator having connection with the motor, a dynamo for charging the accumulator, an engine for operating the dynamo and an electric device for controlling the engine, substantially as described.

12. In combination with a vehicle, electric motors arranged on the vehicle-axle, field-windings of said motors having connection with a main controller, field-windings for the motors connected with an auxiliary controller, an accumulator carried by the vehicle and in electrical connection with the motors, a dynamo for charging the accumulator, and an engine operating the dynamo, substantially as described.

13. The combination of an explosion-engine and a dynamo driven thereby, and electromagnetic means in the circuit of the dynamo for controlling the sparking device of the engine, substantially as described.

14. The combination of an explosion-engine and a dynamo driven thereby, and electromagnetic means in the circuit of the dynamo for controlling the sparking device and the throttle of the engine simultaneously substantially as described.

15. The combination with a dynamo and an engine, of an electromagnetic regulator in the circuit of the dynamo and controlling the engine according to the current in the circuit, substantially as described.

16. The combination with a dynamo and an explosion-engine, of an electromagnetic regulator in the circuit of the dynamo and controlling the voltage of the dynamo through the engine, substantially as described.

17. The combination with an engine having a throttle, of a dynamo, a motor connected therewith, and a solenoid in the circuit of said dynamo and actuated by variations in the current, for controlling the throttle of said engine, substantially as described.

18. The combination with an engine, a dynamo, a storage battery and a motor connected in multiple, of means for automatically varying the output of the dynamo according to its load, substantially as described.

In testimony whereof I have signed my name to this specification in the presence of two subscribing witnesses.

LARS G. NILSON.

Witnesses:
  JNO. M. RITTER,
  C. R. FERGUSON.